(No Model.)
T. CASCADEN, Jr.
KETTLE.
No. 493,974. Patented Mar. 21, 1893.
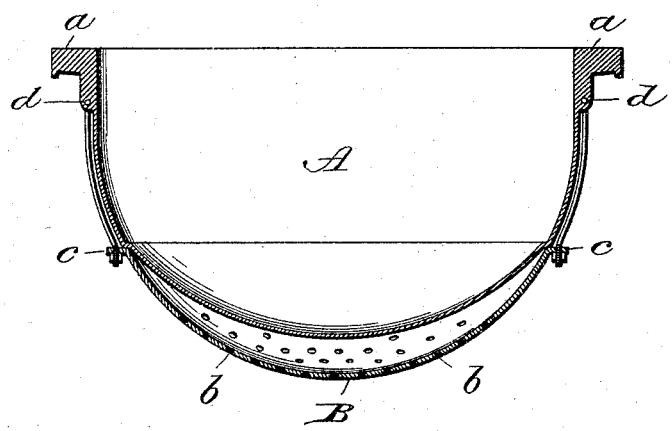
Witnesses
G. S. Elliott
E. W. Johnson
Thomas Cascaden, Jr.
Inventor
by [signature]
Attorney

UNITED STATES PATENT OFFICE.

THOMAS CASCADEN, JR., OF WATERLOO, IOWA.

KETTLE.

SPECIFICATION forming part of Letters Patent No. 493,974, dated March 21, 1893.

Application filed October 14, 1892. Serial No. 448,896. (No model.)

*To all whom it may concern:*

Be it known that I, THOMAS CASCADEN, Jr., a citizen of the United States of America, residing at Waterloo, in the county of Black Hawk and State of Iowa, have invented certain new and useful Improvements in Kettles; and I do hereby declare the following to be a full, clear, and exact description of the invention, such as will enable others skilled in the art to which it appertains to make and use the same, reference being had to the accompanying drawing, and to letters of reference marked thereon, which forms a part of this specification.

This invention relates to improvements in attachments for kettles used by butchers in rendering lard.

The object of the invention is to provide a kettle of ordinary construction with a removable bottom having perforations through which the heat can pass, said bottom preventing the flames coming in contact with the bottom of the kettle, thus preventing the scorching of the contents of the kettle; and the invention consists in the construction and combination of the parts, as will be hereinafter fully set forth and particularly pointed out of the claims.

In the accompanying drawing forming part of this specification the figure is a side elevation, partly in section.

A designates a lard or rendering kettle, which is provided with trunnions $a\ a$.

B designates a false bottom, having a multiplicity of small apertures $b$ at the lower portion thereof, the upper portion being closed or without perforations. This false bottom is removable from the kettle, and in order to make the connection I may provide the false bottom on opposite sides with outwardly projecting portions $c$ with which rods or other means of connection may be attached, said rods or connections passing through perforations $d$ in the ears $a$. If preferred I may use two rods which engage with the projections $a$ and $c$ at one end and are provided with screw threads at the opposite end which engage with a turn-buckle.

In use the false-bottom is secured to the kettle and will prevent the flames coming in contact with the bottom of the kettle proper and scorching the contents thereof, the perforations admitting the heat but keeping out the flames, as said false-bottom fits sufficiently tight around the kettle to prevent any upward draft between the parts; thus practically forming a dead-air space which is filled with hot air or gas.

I am aware that prior to my invention it has been proposed to provide wash-boilers with a false-bottom for the purpose of protecting the bottom of the vessel from being dented or battered, and for holding the bottom flat so that the vessel will stand, said false-bottom or guard having legs to prevent smutting or soiling the surface upon which the boiler having the guard-plate may be set, and I do not claim such as my invention; but What I do claim as new, and desire to secure by Letters Patent, is—

1. In combination with a boiling kettle A, a curved or semi-spherical guard plate having a number of perforations at the lower portion thereof, the upper edge of said guard-plate being adapted to contact with the kettle so as to provide an air-tight space above the perforations between the kettle and false-bottom or guard-plate, substantially as shown and for the purpose set forth.

2. In combination with a kettle A having ears, and means extending therefrom for attaching to the kettle a false-bottom having a centrally perforated portion, the upper portion of said false-bottom being without perforations and adapted to contact with the kettle, for the purpose set forth.

3. In combination with a kettle having a bottom convex on its under side, a concavo-convex guard-plate having an outwardly projecting flange adapted to bear against a shoulder formed on the kettle, said guard-plate having at its lower portion a multiplicity of perforations, the parts being so shaped that the greatest distance between the guard-plate and kettle is at the center, for the purpose set forth.

In testimony whereof I affix my signature in presence of two witnesses.

THOMAS CASCADEN, JR.

Witnesses:
 THEODORE A. JENNY,
 WM. C. LOGAN.